(12) United States Patent  
Ogasawara

(10) Patent No.: US 9,019,330 B2  
(45) Date of Patent: Apr. 28, 2015

(54) OPTICAL SCANNING DEVICE AND IMAGE FORMING APPARATUS

(71) Applicant: KYOCERA Document Solutions Inc., Osaka-shi, Osaka (JP)

(72) Inventor: Hideyuki Ogasawara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/850,503

(22) Filed: Mar. 26, 2013

(65) Prior Publication Data

US 2013/0258032 A1     Oct. 3, 2013

(30) Foreign Application Priority Data

Mar. 28, 2012   (JP) ................................. 2012-072793

(51) Int. Cl.
| | |
|---|---|
| G02B 26/12 | (2006.01) |
| G02B 26/10 | (2006.01) |
| H04N 1/50 | (2006.01) |
| G03G 15/043 | (2006.01) |

(52) U.S. Cl.  
CPC ............ *G03G 15/043* (2013.01); *G02B 26/121* (2013.01); *G02B 26/10* (2013.01); *H04N 1/506* (2013.01)

(58) Field of Classification Search  
CPC ...... G03G 15/043; G02B 26/02; G02B 26/10; G02B 26/121; B41J 2/473; B41J 2/471; H04N 1/506  
USPC .................................. 347/236, 237, 246, 247  
See application file for complete search history.

(56) References Cited

U.S. PATENT DOCUMENTS

| 4,899,348 A | * | 2/1990 | Kiya et al. .................. 372/29.01 |
| 6,504,558 B1 | * | 1/2003 | Takayama ..................... 347/132 |
| 2007/0097201 A1 | * | 5/2007 | Kanzaki et al. ............... 347/243 |

FOREIGN PATENT DOCUMENTS

| EP | 1075137 B1 * | 1/2005 |
| JP | Hei-1-179058 | 7/1989 |
| JP | Hei 4-331911 | 11/1992 |
| JP | 2007-148356 | 6/2007 |
| JP | 2007-203543 | 8/2007 |

OTHER PUBLICATIONS

Japanese Office Action—Jun. 24, 2014.

* cited by examiner

*Primary Examiner* — Sarah Al Hashimi  
(74) *Attorney, Agent, or Firm* — Gerald E. Hespos; Michael J. Porco; Matthew T. Hespos

(57) ABSTRACT

Optical scanning device includes as follows. Light emitting element emits light beam in First direction and Second direction. Mirror unit reflects light beam emitted in First direction. First light receiving element receives light beam reflected by Mirror unit. Reference signal generator generates BD signal based on signal output from First light receiving element. Second light receiving element receives light beam emitted in Second direction. Light quantity controller measures signal output from Second light receiving element and automatically controls the light quantity of light beam emitted during APC period. Light quantity controller starts the automatic control at a timing at which light beam reflected by Mirror unit passes through the position of Second light receiving element and is received by First light receiving element and completes the automatic control before light beam reflected by Mirror unit reaches the position of Second light receiving element next.

11 Claims, 4 Drawing Sheets

OPTICAL SCANNING DEVICE AND IMAGE FORMING APPARATUS

This application is based on Japanese Patent Application Serial No. 2012-72793 filed with the Japan Patent Office on Mar. 28, 2012, the contents of which are hereby incorporated by reference.

BACKGROUND

The present disclosure relates to a technology for automatically controlling the light quantity of a light beam emitted from a light emitting element which acts as a light source of an optical scanning device (APC: Automatic Power Control).

An optical scanning device is a device for drawing a scanning line by emitting a light beam and installed in an image forming apparatus such as a printer, a projector or the like. A semiconductor laser is used as a light emitting element which acts as a light source of the optical scanning device. Even at the same drive current, the light quantity of a light beam emitted from the semiconductor laser differs depending on temperature. Thus, the APC is performed to bring the light quantity of the light beam emitted from the semiconductor laser to a target value.

An APC in an image forming apparatus is briefly described. A semiconductor laser which acts as a light source of an optical scanning device simultaneously emits light beams forward and backward. The light beam emitted forward is used to draw a main scanning line. Specifically, the light beam emitted forward is reflected by a polygon mirror disposed in front of the semiconductor laser and the main scanning line is drawn on a photoconductive drum by the reflected light beam.

The light beam emitted backward is used for the APC. Specifically, the light beam emitted backward is received by a photodiode disposed behind the semiconductor laser. During an APC period, the light quantity of the light beam emitted backward is feedback-controlled to a target value based on a signal output from the photodiode.

Since the light beam emitted forward and the one emitted backward are emitted from the same semiconductor laser, the light quantity is same. Accordingly, the light quantity of the light beam emitted forward can be feedback-controlled to the target value by feedback-controlling the light quantity of the light beam emitted backward based on the light quantity of the light beam emitted backward.

When the light beam emitted forward is reflected by the polygon mirror and received by the photodiode arranged behind the semiconductor laser during the APC period, the photodiode receives the light beam emitted forward and reflected by the polygon mirror in addition to the light beam emitted backward. This may lead to erroneous recognition that the light quantity of the light beam emitted backward reaches the target value although the light quantity of the light beam emitted backward has not reached the target value yet. The drawing of the main scanning line by the light beam, the light quantity of which has not reached the target value, causes a reduction in image quality.

Accordingly, an optical scanning device has been proposed which can perform an APC without being affected by the light beam reflected by the polygon mirror. This optical scanning device performs the APC based on a synchronization detection signal obtained by a light receiving element while avoiding a timing at which an incident angle of the light beam with respect to the polygon mirror becomes substantially 90°.

An object of the present disclosure is to provide an optical scanning device and an image forming apparatus capable of performing an APC without being affected by a light beam reflected by a mirror unit.

SUMMARY

An optical scanning device according to one aspect of the present disclosure includes a light emitting element, an optical deflector, a first light receiving element, a reference signal generator, a second light receiving element and a light quantity controller. The light emitting element simultaneously emits light beams in a first direction and a second direction. The optical deflector includes a mirror unit for reflecting the light beam emitted in the first direction and draws a scanning line by the light beam by driving the mirror unit. The first light receiving element receives the light beam reflected by the mirror unit. The reference signal generator generates a reference signal, which acts as a reference to a timing at which the drawing of the scanning line is started, based on a signal output from the first light receiving element. The second light receiving element receives the light beam emitted in the second direction. The light quantity controller measures a signal output from the second light receiving element and automatically controls the light quantity of the light beam emitted from the light emitting element during an APC period for automatically controlling the light quantity of the light beam emitted from the light emitting element. The light quantity controller starts the automatic control at a timing at which the light beam reflected by the mirror unit passes through the position of the second light receiving element and is received by the first light receiving element and completes the automatic control before the light beam reflected by the mirror unit reaches the position of the second light receiving element next.

An image forming apparatus according to another aspect of the present disclosure includes an image bearing member, an optical scanning device according to the one aspect of the present disclosure and a developing unit. The optical scanning device forms an electrostatic latent image by drawing the scanning line on the image bearing member. The developing unit forms a toner image by supplying toner to the image bearing member on which the electrostatic latent image is formed.

These and other objects, features and advantages of the present disclosure will become more apparent upon reading the following detailed description along with the accompanying drawings.

DETAILED DESCRIPTION

Figure 1:
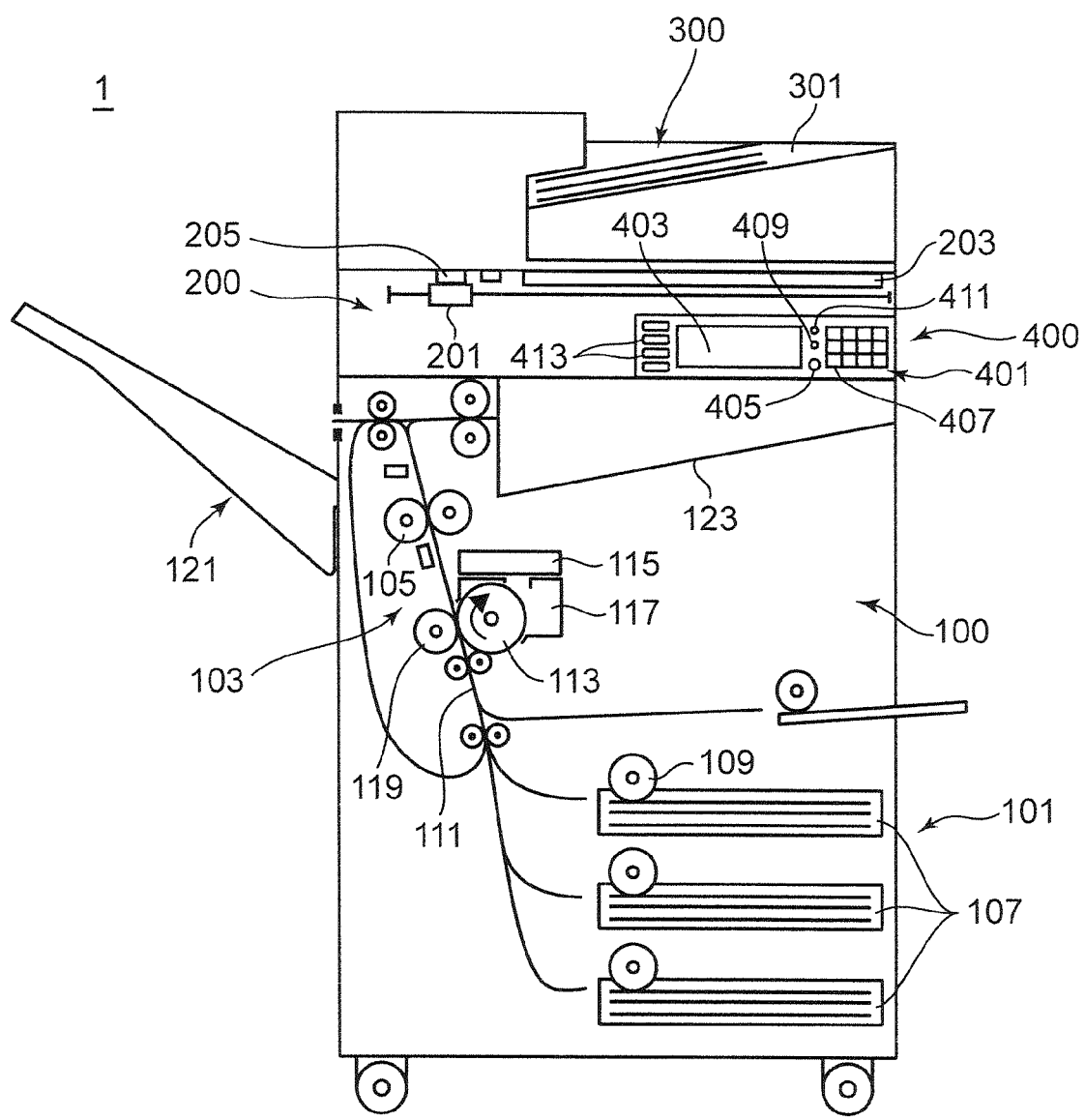
FIG. 1 is a view schematically showing the internal structure of an image forming apparatus according to one embodiment of the present disclosure.

Hereinafter, an embodiment of the present disclosure is described in detail based on the drawings. FIG. 1 is a view schematically showing the internal structure of an image forming apparatus 1 according to one embodiment of the present disclosure. The image forming apparatus 1 can be applied to a digital complex machine having copier, printer, scanner and facsimile functions. The image forming apparatus 1 includes an apparatus main body 100, a document reading unit 200 arranged atop the apparatus main body 100, a document feeding unit 300 arranged atop the document reading unit 200 and an operation unit 400 arranged on the front surface of an upper part of the apparatus main body 100.

The document feeding unit 300 functions as an automatic document feeder and can successively feed a plurality of documents placed on a document placing portion 301 to the document reading unit 200.

The document reading unit 200 includes a carriage 201 carrying an exposure lamp and the like, a document platen 203 made of a transparent material such as glass, an unillustrated CCD (Charge Coupled Device) sensor and a document reading slit 205. In the case of reading a document placed on the document platen 203, the document is read by the CCD sensor while the carriage 201 is moved in a longitudinal direction of the document platen 203. Contrary to this, in the case of reading a document fed from the document feeding unit 300, the carriage 201 is moved to a position facing the document reading unit 205 and the document fed from the document feeding unit 300 is read by the CCD sensor through the document reading slit 205. The CCD sensor outputs the read document image as image data.

The apparatus main body 100 includes a sheet storage unit 101, an image forming unit 103 and a fixing unit 105. The sheet storage unit 101 is arranged in a bottommost part of the apparatus main body 100 and includes sheet trays 107 capable of storing a stack of sheets. The uppermost sheet in the stack of sheets stored in the sheet tray 107 is fed toward a sheet conveyance path 111 by driving a pickup roller 109. The sheet is conveyed to the image forming unit 103 through the sheet conveyance path 111.

The image forming unit 103 forms a toner image on a sheet conveyed thereto. The image forming unit 103 includes a photoconductive drum 113, an exposure unit 115, a developing unit 117 and a transfer unit 119. The exposure unit 115 generates light modulated in correspondence with image data (image data output from the document reading unit 200, image data transmitted from a personal computer, facsimile received image data or the like) and irradiates it to the uniformly charged circumferential surface of the photoconductive drum 113. In this way, an electrostatic latent image corresponding to the image data is formed on the circumferential surface of the photoconductive drum 113. By supplying toner from the developing unit 117 to the circumferential surface of the photoconductive drum 113 in this state, a toner image corresponding to the image data is formed on the circumferential surface. This toner image is transferred to a sheet conveyed from the sheet storage unit 101 described above by the transfer unit 119.

The sheet having the toner image transferred is fed to the fixing unit 105. In the fixing unit 105, heat and pressure are applied to the toner image and the sheet, whereby the toner image is fixed to the sheet. The sheet is ejected to a stack tray 121 or a sheet ejecting tray 123.

The operation unit 400 includes an operation key unit 401 and a display unit 403. The display unit 403 has a touch panel function and displays a screen including soft keys. A user makes necessary settings for the execution of a function such as copying by operating soft keys while viewing the screen.

The operation key unit 401 includes operation keys which are hard keys. Specifically, the provided keys include a start key 405, a numerical keypad 407, a stop key 409, a reset key 411, function changeover keys 413 for switching the copier function, the printer function, the scanner function and the facsimile function from one to another, and the like.

The start key 405 is a key for starting an operation such as copying and facsimile transmission. The numerical keypad 407 includes keys used to input numbers such as the number of copies to be made and facsimile numbers. The stop key 409 is a key for stopping a copy operation and the like halfway. The reset key 411 is a key for returning the set content to an initially set state.

The function changeover keys 413 include a copy key, a transmit key and the like and used to switch the copy function, the transmit function and the like from one to another. If the copy key is operated, an initial screen for copy is displayed on the display unit 403. If the transmit key is operated, an initial screen for facsimile transmission and mail transmission is displayed on the display unit 403.

Figure 2:
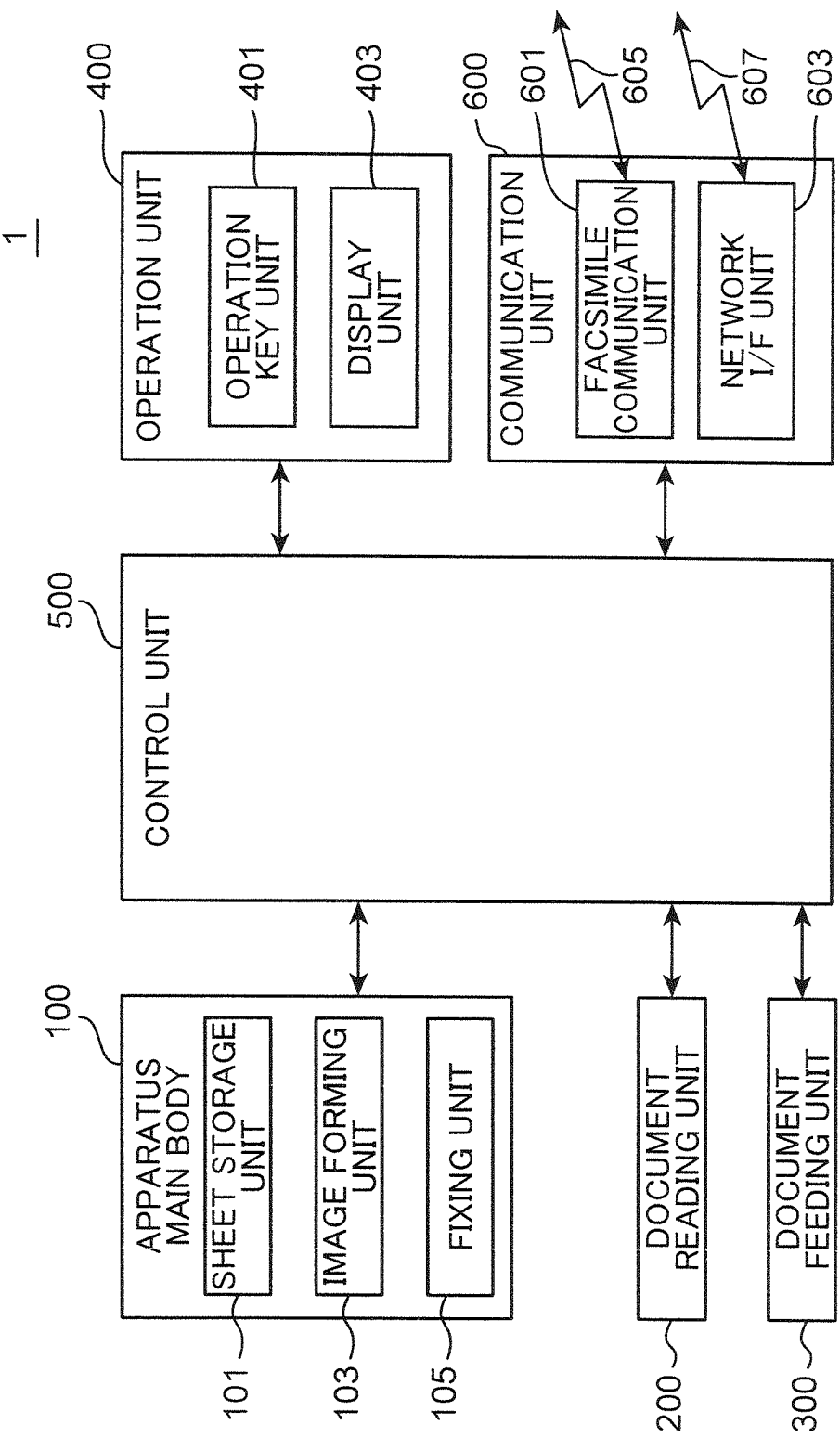
FIG. 2 is a block diagram showing the configuration of the image forming apparatus shown in FIG. 1.

FIG. 2 is a block diagram showing the configuration of the image forming apparatus 1 shown in FIG. 1. The image forming apparatus 1 is so configured that the apparatus main body 100, the document reading unit 200, the document feeding unit 300, the operation unit 400, a control unit 500 and a communication unit are connected to each other via a bus. Since being already described, the apparatus main body 100, the document reading unit 200, the document feeding unit 300 and the operation unit 400 are not described here.

The control unit 400 includes a CPU (Central Processing Unit), a ROM (Read Only Memory), a RAM (Random Access Memory), an image memory and the like. The CPU performs a control necessary to operate the image forming apparatus 1 on the above constituent elements of the image forming apparatus 1 such as the apparatus main body 100. The ROM stores software necessary to control the operation of the image forming apparatus 1. The RAM is used to temporarily store data generated during the execution of the software and store application software and the like. The image memory temporarily stores image data (image data output from the document reading unit 200, image data transmitted from a personal computer, facsimile received image data or the like).

The communication unit 600 includes a facsimile communication unit 601 and a network I/F unit 603. The facsimile communication unit 601 includes an NCU (Network Control Unit) for controlling the connection of a telephone line to a destination facsimile machine and a modulation/demodulation circuit for modeling/demodulating a signal for facsimile communication. The facsimile communication unit 601 is connected to a telephone line 605.

The network I/F unit 603 is connected to a LAN (Local Area Network) 607. The network I/F unit 603 is a communication interface circuit for carrying out a communication with a terminal unit such as a personal computer connected to the LAN 607.

Figure 3:
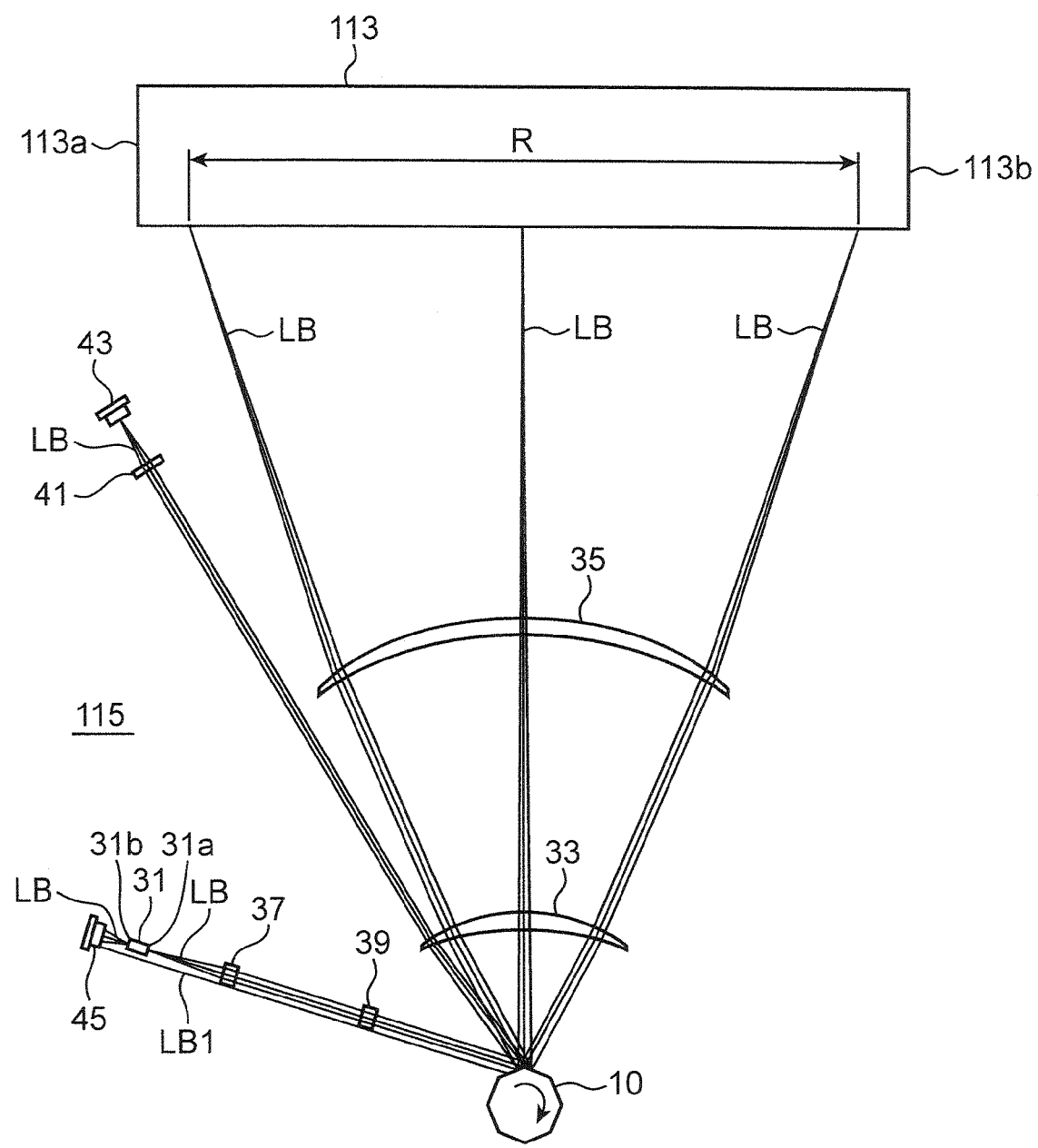
FIG. 3 is a diagram showing an arrangement relationship of optical components configuring an exposure unit provided in the image forming apparatus shown in FIG. 1.

The exposure unit 115 is described in detail. FIG. 3 is a diagram showing an arrangement relationship of optical components configuring the exposure unit 115. The exposure unit 115 is an example of an optical scanning device and includes a laser diode 31, a polygon mirror 10, two scanning lenses 33, 35 and the like.

The laser diode 31 is an example of a light emitting element. The laser diode 31 is a semiconductor laser including a first end surface 31*a* from which a laser beam LB is emitted forward (an example of a first direction) and a second end surface 31*b* from which a laser beam LB is emitted backward (an example of a second direction). The laser diode 31 simultaneously emits the laser beams LB forward and backward.

The polygon mirror 10 functions as a mirror unit and is rotated by a motor (not shown in FIG. 3). The laser beam LB emitted from the first end surface 31a of the laser diode 31 is reflected by the polygon mirror 10 to draw a main scanning line (an example of a scanning line). An optical deflector is configured by the polygon mirror 10 and the motor. A MEMS (Micro Electro Mechanical Systems) mirror can be used as the optical deflector.

The laser beam LB emitted from the second end surface 31b of the laser diode 31 is received by a photodiode 45 (an example of a second light receiving element).

A collimator lens 37 and a cylindrical lens 39 are arranged on an optical path between the laser diode 31 and the polygon mirror 10. The collimator lens 37 converts the laser beam LB emitted from the first end surface 31a of the laser diode 31 into parallel light. The cylindrical lens 38 linearly focuses the laser beam LB converted into parallel light. The linearly focused laser beam LB is incident on the polygon mirror 10.

The scanning lenses 33 and 35 are arranged on an optical path between the polygon mirror 10 and the photoconductive drum 113. The laser beam LB incident on a deflecting surface of the polygon mirror 10 is reflected and deflected by that deflecting surface and imaged on the photoconductive drum 113 by the scanning lenses 33, 35. Specifically, an electrostatic latent image is formed on the photoconductive drum 113 by scanning the laser beam LB across the photoconductive drum 113 from one side part 113a toward another side part 113b of the photoconductive drum 113. A main scanning line in an effective scanning range R of the photoconductive drum 113 is treated as an effective image. The photoconductive drum 113 is an example of an image bearing member.

The exposure unit 115 further includes a BD lens 41 and a BD sensor 43. The BD sensor 43 is arranged at such a position that the laser beam LB reflected by the polygon mirror 10 reaches the BD sensor 43, the one side part 113a of the photoconductive drum 113 and the other side part 113b of the photoconductive drum 113 in this order. In other words, the BD sensor 43 is arranged at such a position as to be able to receive the laser beam LB before the laser beam LB enters the effective scanning range R.

The laser beam LB reflected by the polygon mirror 10 is focused by the BD lens 41 and received by the BD sensor 43. The BD (Beam Detect) sensor 43 is an example of a first light receiving element.

The laser beam LB reflected by the polygon mirror 10 passes through the position of the photodiode 45, that of the BD sensor 43 and that of the photoconductive drum 113. The laser beam LB passing through the position of the photodiode 45 is shown by a laser beam LB1. The photodiode 45 receives the laser beam LB1 emitted forward from the first end surface 31a of the laser diode 31 and reflected by the polygon mirror 10 in addition to the laser beam LB emitted backward from the second end surface 31b of the laser diode 31. This causes a problem of erroneous recognition that the light quantity of the laser beam LB emitted backward has reached a target value although the light quantity of the laser beam LB emitted backward has not reached the target value yet.

Figure 4:
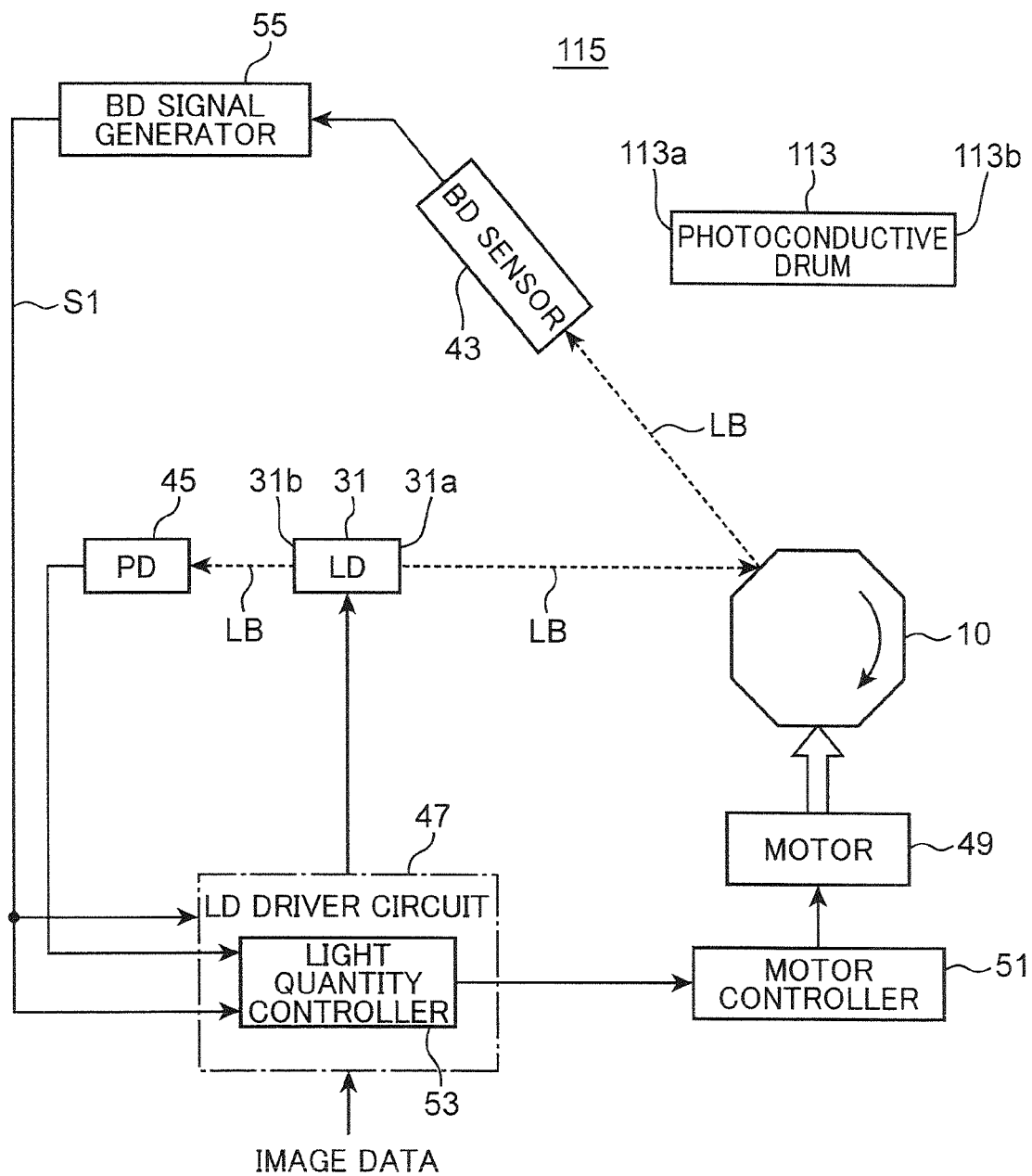
FIG. 4 is a block diagram showing the configuration of the exposure unit provided in the image forming apparatus shown in FIG. 1.

FIG. 4 is a block diagram showing the configuration of the exposure unit 115. The lenses such as the collimator lens 37 are not shown. The exposure unit 115 includes the laser diode 31, an LD driver circuit 47, the photodiode 45, the polygon mirror 10, a motor 49, a motor controller 51, the BD sensor 43 and a BD signal generator 55. The laser diode 31, the photodiode 45, the polygon mirror 10 and the BD sensor 43 are not described since being already described.

The motor 49 rotates the polygon mirror 10. The motor controller 51 is, for example, realized by a motor driver circuit and controls the rotation of the polygon mirror 10 by controlling the rotation of the motor 49. The motor controller 51 is an example of a drive controller for controlling the drive of the mirror unit.

The BD signal generator 55 is an example of a reference signal generator and generates a BD signal S1 (an example of a reference signal), which acts as a reference to a timing at which the drawing of a main scanning line is started, based on a signal output from the BD sensor 43.

The LD driver circuit 47 performs various controls of the laser diode 31. Specifically, the LD driver circuit 47 generates a drive current for the laser diode 31. The BD signal S1 and an image data signal representing an image to be printed on a sheet are input to the LD driver circuit 47.

During a period of drawing a main scanning line, the LD driver circuit 47 turns on the laser diode 31. A laser beam LB is emitted forward from the first end surface 31a of the laser diode 31 and a laser beam LB is emitted backward from the second end surface 31b. The LD driver circuit 47 controls the lighting of the laser diode 31 based on an image data signal when the laser beam LB emitted from the first end surface 31a reaches the effective scanning range R after being reflected by the polygon mirror 10 and received by the BD sensor 43. In this way, a main scanning line is drawn on the photoconductive drum 113. A timing at which the drawing of the main scanning line is started is based on the BD signal S1. When the laser beam LB reaches beyond the effective scanning range R, the LD driver circuit 47 forcibly turns on the laser diode 31 at a predetermined timing. This makes it possible for the laser beam LB reflected by the polygon mirror to be received by the BD sensor 43 in drawing a next main scanning line.

Contrary to this, the LD driver circuit 47 automatically controls the light quantity of the laser beam LB emitted from the laser diode 31 to a target value during an APC period. The automatic control is performed by a light quantity controller 53 of the LD driver circuit 47. The light quantity controller 53 measures a signal output from the photodiode 45 and automatically controls the light quantity of the laser beam LB emitted from the laser diode 31.

Specifically, the light quantity controller 53 forcibly turns on the laser diode 31. A laser beam LB is emitted forward from the first end surface 31a of the laser diode 31 and a laser beam LB is emitted backward from the second end surface 31b. The light quantity controller 53 measures a voltage output from the photodiode 45 receiving the laser beam LB emitted from the second end surface 31b and calculates the light quantity of the laser beam LB from that voltage. Unless the light quantity has reached the target value, the light quantity controller 53 increases the drive current for the laser diode 31a little, measures a voltage output from the photodiode 45 and calculates the light quantity of the laser beam LB from that voltage. The light quantity controller 53 repeats the above process until the light quantity reaches the target value.

The BD signal S1 is input to the light quantity controller 53. The light quantity controller 53 starts the automatic control at a timing at which the laser beam LB reflected by the polygon mirror 10 passes through the position of the photodiode 45 and is received by the BD sensor 43 and completes the automatic control before the laser beam LB1 reflected by the polygon mirror 10 reaches the position of the photodiode 45 next.

During the APC period, the motor controller 51 sets the rotation speed of the polygon mirror 10 equal to that of the polygon mirror 10 during a main scanning line drawing period (first speed). This is to make it possible to start the drawing of a next main scanning line immediately after the completion of the automatic control.

However, if the light quantity controller 53 performs the automatic control and the automatic control cannot be completed before the laser beam LB1 reflected by the polygon mirror 10 reaches the position of the photodiode 45 next the light quantity controller 53 gives a command to reduce the rotation speed of the polygon mirror 10 to the motor controller 51. This causes the motor controller 51 to reduce the rotation speed of the motor 49 and the light quantity controller 53 performs the automatic control after the rotation speed of the polygon mirror 10 is reduced (after a reduction to a second speed slower than the first speed).

Main effects of this embodiment are described. In this embodiment, the automatic control is started at the timing at which the laser beam LB reflected by the polygon mirror 10 passes through the position of the photodiode 45 and is received by the BD sensor 43 and subsequently completed before the laser beam LB1 reflected by the polygon mirror 10 reaches the position of the photodiode 45 next. Thus, the automatic control (APC) can be performed without being affected by the laser beam LB1 reflected by the polygon mirror 10.

In this embodiment, the automatic control is started at the timing at which the laser beam LB1 reflected by the polygon mirror 10 is received by the BD sensor 43 and subsequently completed before the laser beam LB reflected by the polygon mirror 10 reaches the position of the photodiode 45 next. Thus, there is a possibility that a period of the automatic control is short and the automatic control cannot be completed. Accordingly, according to this embodiment, the automatic control is performed after the drive speed of the mirror unit is reduced if the automatic control cannot be completed, i.e. if the period of the automatic control is insufficient. Therefore, a period necessary to complete the automatic control can be ensured.

A modification of this embodiment is described. In the modification, the light quantity controller 53 shown in FIG. 4 starts an automatic control at a timing at which a light beam LB reflected by the polygon mirror 10 is received by the BD sensor 43 and completes the automatic control before the light beam LB reflected by the polygon mirror 10 reaches the other side part 113b of the photoconductive drum 113.

When the light beam LB having passed through the other side part 113b of the photoconductive drum 113 is reflected by a certain member in the exposure unit 115 and received by the photodiode 45, there is a possibility of erroneous recognition that the light quantity of the light beam LB has reached the target value in the automatic control. According to the modification, the automatic control is completed before the light beam LB reflected by the polygon mirror 10 reaches the other side part 113b of the photoconductive drum 113. Thus, the above erroneous recognition can be prevented.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:
1. An optical scanning device, comprising:
a light emitting element for simultaneously emitting light beams in a first direction and a second direction;
an optical deflector, including a mirror unit for reflecting the light beam emitted in the first direction, for drawing a scanning line by the light beam by driving the mirror unit;
a drive controller for controlling the drive of the mirror unit;
a first light receiving element for receiving the light beam reflected by the mirror unit;
a reference signal generator for generating a reference signal, which acts as a reference to a timing at which the drawing of the scanning line is started, based on a signal output from the first light receiving element;
a second light receiving element for receiving the light beam emitted in the second direction; and
a light quantity controller for measuring a signal output from the second light receiving element and automatically controlling the light quantity of the light beam emitted from the light emitting element during an APC period for automatically controlling the light quantity of the light beam emitted from the light emitting element; wherein:
the light quantity controller starts the automatic control at a timing at which the light beam reflected by the mirror unit passes through the position of the second light receiving element and is received by the first light receiving element and completes the automatic control before the light beam reflected by the mirror unit reaches the position of the second light receiving element next; and
the light quantity controller performs the automatic control after causing the drive controller to perform a control to reduce a drive speed of the mirror unit if the automatic control is not completed before the light beam reflected by the mirror unit reaches the position of the second light receiving element next.

2. An optical scanning device according to claim 1, wherein:
the light emitting element is a semiconductor laser including a first end surface from which a light beam is emitted in the first direction and a second end surface from which a light beam is emitted in the second direction opposite to the first direction.

3. An optical scanning device according to claim 1, wherein:
the mirror unit is a polygon mirror.

4. An image forming apparatus, comprising:
an image bearing member;
an optical scanning device according to claim 1 for forming an electrostatic latent image by drawing the scanning line on the image bearing member; and
a developing unit for forming a toner image by supplying toner to the image bearing member on which the electrostatic latent image is formed.

5. An image forming apparatus according to claim 4, wherein:
the light emitting element is a semiconductor laser including a first end surface from which a light beam is emitted in the first direction and a second end surface from which a light beam is emitted in the second direction opposite to the first direction.

6. An image forming apparatus according to claim 4, wherein:
the mirror unit is a polygon mirror.

7. An image forming apparatus according to claim 4, wherein:
the image bearing member includes one side part and another side part;

the optical deflector draws the scanning line on the image bearing member from the one side part toward the other side part;

the first light receiving element is arranged at such a position that the light beam reflected by the mirror unit reaches the first light receiving element, the one side part and the other side part in this order; and the light quantity controller completes the automatic control before the light beam reflected by the mirror unit reaches the other side part.

8. An image forming apparatus according to claim 7, wherein:

the light emitting element is a semiconductor laser including a first end surface from which a light beam is emitted in the first direction and a second end surface from which a light beam is emitted in the second direction opposite to the first direction.

9. An image forming apparatus according to claim 7, wherein:

the mirror unit is a polygon mirror.

10. An optical scanning device, comprising:

a light emitting element for simultaneously emitting light beams in a first direction and a second direction;

an optical deflector, including a mirror unit for reflecting the light beam emitted in the first direction, for drawing a scanning line by the light beam by driving the mirror unit;

a drive controller for controlling the drive of the mirror unit;

a first light receiving element for receiving the light beam reflected by the mirror unit;

a reference signal generator for generating a reference signal, which acts as a reference to a timing at which the drawing of the scanning line is started, based on a signal output from the first light receiving element;

a second light receiving element for receiving the light beam emitted in the second direction; and a light quantity controller for measuring a signal output from the second light receiving element and automatically controlling the light quantity of the light beam emitted from the light emitting element during an APC period for automatically controlling the light quantity of the light beam emitted from the light emitting element, wherein:

the light quantity controller starts the automatic control at a timing at which the light beam reflected by the mirror unit passes through the position of the second light receiving element and is received by the first light receiving element and completes the automatic control before the light beam reflected by the mirror unit reaches the position of the second light receiving element next;

the light quantity controller performs the automatic control while causing the drive controller to perform a control to set a drive speed of the mirror unit during a period of the automatic control at a first speed equal to the drive speed of the mirror unit during a period of drawing the scanning line; and the light quantity controller performs the automatic control after causing the drive controller to perform a control to reduce the drive speed of the mirror unit to a second speed slower than the first speed if the automatic control is not completed at the first speed.

11. An image forming apparatus, comprising:

an image bearing member;

an optical scanning device according to claim 3 for forming an electrostatic latent image by drawing the scanning line on the image bearing member; and a developing unit for forming a toner image by supplying toner to the image bearing member on which the electrostatic latent image is formed.

* * * * *